US010865088B2

(12) United States Patent
Knieling

(10) Patent No.: US 10,865,088 B2
(45) Date of Patent: Dec. 15, 2020

(54) APPARATUS AND METHOD FOR FILLING CONTAINERS WITH A FILLING PRODUCT

(71) Applicant: KRONES AG, Neutraubling (DE)

(72) Inventor: Erwin Knieling, Neutraubling (DE)

(73) Assignee: Krones AG, Neutraubling (DE)

( * ) Notice: Subject to any disclaimer, the term of this patent is extended or adjusted under 35 U.S.C. 154(b) by 202 days.

(21) Appl. No.: 15/739,015

(22) PCT Filed: Jun. 12, 2017

(86) PCT No.: PCT/EP2017/064252
§ 371 (c)(1),
(2) Date: May 30, 2018

(87) PCT Pub. No.: WO2017/212065
PCT Pub. Date: Dec. 14, 2017

(65) Prior Publication Data

US 2018/0334373 A1 Nov. 22, 2018

(30) Foreign Application Priority Data

Jun. 10, 2016 (DE) ........................ 10 2016 110 721

(51) Int. Cl.

| | |
|---|---|
| ***B65B 1/30*** | (2006.01) |
| ***B67C 3/28*** | (2006.01) |
| ***B67C 3/00*** | (2006.01) |
| ***G01F 23/292*** | (2006.01) |
| ***B67C 3/22*** | (2006.01) |
| ***B67C 3/24*** | (2006.01) |

(52) U.S. Cl.
CPC .............. *B67C 3/284* (2013.01); *B67C 3/007* (2013.01); *B67C 3/225* (2013.01); *B67C 3/24* (2013.01); *G01F 23/2921* (2013.01)

(58) Field of Classification Search
CPC ............ B67C 3/284; B67C 3/007; B65B 3/30
See application file for complete search history.

(56) References Cited

U.S. PATENT DOCUMENTS

| | | | | |
|---|---|---|---|---|
| 6,753,527 B1 * | 6/2004 | Yamagishi | .......... | G01F 23/2921 250/223 B |
| 7,982,201 B2 * | 7/2011 | Bryant | .................. | G01F 23/292 250/577 |
| 8,037,659 B2 * | 10/2011 | Osborne | ............... | A61J 1/2096 250/577 |
| 2003/0052288 A1 * | 3/2003 | Calhoun | ............... | G01F 23/292 250/577 |

(Continued)

FOREIGN PATENT DOCUMENTS

| | | |
|---|---|---|
| DE | 4446548 | 6/1996 |
| DE | 102014216576 | 2/2016 |
| JP | 2006240658 | 9/2006 |

*Primary Examiner* — Reinaldo Sanchez-Medina
(74) *Attorney, Agent, or Firm* — Haynes and Boone, LLP

(57) ABSTRACT

A device for filling a container with a filling product in a beverage filling plant is provided. A transporting device for transporting a container to be filled during the filling process is provided, wherein the transporting device transports the container to be filled along a transporting path, and wherein at least one determining unit for determining the fill level of the filling product in the container is provided, wherein at least one of the determining units can be displaced synchronously with the transporting device at least in a sub-section of the transporting path of the container.

18 Claims, 2 Drawing Sheets

1
2
A
T
V
t
52
50
5
25
23
26
20
6
6
e
22
8
6
24
51
r
E
8
53
54
3
4

(56) References Cited

U.S. PATENT DOCUMENTS

| | | | | |
|---|---|---|---|---|
| 2005/0252574 | A1* | 11/2005 | Khan | B65B 57/145 141/198 |
| 2006/0283145 | A1* | 12/2006 | Weisgerber | B07C 5/3408 53/167 |
| 2007/0107801 | A1* | 5/2007 | Cochran | B65B 57/145 141/153 |
| 2010/0220187 | A1* | 9/2010 | Lichtblau | G01F 23/292 348/135 |
| 2010/0243667 | A1* | 9/2010 | Keyes | B65B 3/30 221/1 |
| 2013/0292230 | A1* | 11/2013 | Marcantoni | B67B 3/26 198/502.3 |
| 2014/0110222 | A1* | 4/2014 | Prieto Male | B65G 29/00 198/470.1 |
| 2016/0052764 | A1* | 2/2016 | Fuhrer | G06T 7/0004 348/143 |
| 2017/0183116 | A1* | 6/2017 | Pedercini | B67C 3/22 |

* cited by examiner

APPARATUS AND METHOD FOR FILLING CONTAINERS WITH A FILLING PRODUCT

CROSS REFERENCE TO RELATED APPLICATIONS

This application is a national stage of International Application No. PCT/EP2017/064252, filed Jun. 12, 2017, which claims priority from German Patent Application No. 10 2016 110 721.2 filed on Jun. 10, 2016 in the German Patent and Trademark Office, the disclosures of which are incorporated herein by reference in their entirety.

BACKGROUND

Technical Field

The present invention relates to a device and a method for filling containers with a filling product, for example for filling bottles in a beverage filling plant.

Related Art

In beverage filling plants, it is known to fill containers that are to be filled with a filling product in a filler, for example a filler designed as a rotary filler. The flow of filling product is guided into the containers to be filled via a filling valve. In order to control or regulate the start and end of the flow of filling product, and in order to achieve a desired final fill level in the container to be filled, various means of determining the end of the filling process are known.

It is for example known to determine the mass of the filling product already filled in the container by means of a weighing cell and, when a predetermined mass is reached, to close the filling valve and in this manner to effect the ending the filling process. After the closure of the filling valve, there is usually an overrun of filling product from the areas of the filling element that are disposed below the actual valve and through which the filling product flows. This overrun must be taken into account in determining the end of the filling process. The end of the filling process can also be determined, for example, by means of a flow meter.

Weighing cells, however, require a complex design of the filler, and flow meters are limited to use with conductive filling products. Furthermore, when the filling process involves filling products with non-uniform density, such as for example juices containing a proportion of pulp, or containers such as glass bottles which have variations in volume between individual containers, the types of filling discussed above can lead to greater or lesser deviations in the fill level of the filling product in the individual containers.

In order to obtain a predetermined fill level, and thereby to achieve a uniform visual appearance of the filled containers, it is further known to determine the fill level using a return gas tube or fill level probe dipped in the container. In these devices, the probe or return gas tube is in contact with the filling product, which increases the cleaning costs. In addition, because the tube or probe dips into the container, it is necessary to lift the container on the filler from a transfer position to a filling position, which requires a complex mechanical design.

In order to overcome the above-mentioned disadvantages, filling devices and filling methods are known in which the fill level is measured by optical means. Thus DE 102011 075 459 A1 discloses, in addition to a measuring probe that is in contact with the filling product, the provision of a stationary camera, which provides additional optical monitoring of the fill level of the filling product.

DE 43 06 120 C1 shows a rotary filler in which a stationary video camera is provided in the region in which filling ends, for measuring simultaneously the fill level of several containers that are transported through the field of view of the video camera.

SUMMARY

An improved device for filling containers with a filling product, for example for filling bottles in a beverage filling plant, and a corresponding method are provided.

Accordingly, a device for filling a container with a filling product in a beverage filling plant is proposed, wherein a transporting device for transporting a container to be filled during the filling process is provided, wherein the transporting device transports the container to be filled along a transporting path, and wherein at least one determining unit for determining the fill level of the filling product in the container is provided. At least one determining unit can be displaced synchronously with the transporting device in a sub-section of the transporting path of the container.

Due to the fact that at least one optical determining unit can be displaced synchronously with the transporting device in a sub-section of the transporting path of the container, the at least one determining unit can monitor the fill height of a container to be filled that is displaced by the transporting device during its transport in the sub-section of the transporting path in which the transporting device can transport the container. In particular, the determining unit can measure the actual fill level of the filling product that is to be filled in the container. This enables the fill level of the filling product to be measured in a contact-free manner, which among other advantages leads to a microbiological improvement, since the filling process takes place without contact between the filling product and a fill level gauge which contacts the product. The immersion of a fill level tube or fill level probe is thereby unnecessary.

Furthermore, the conveying of a filling device to the container to be filled, or the conveying of the container to be filled to the filling device, can take place with a smaller relative vertical displacement between the container and the filling element. By means of the reduction in the vertical displacement, it is possible to provide, by comparison with the state of the art, a larger filling area, in the case of a rotary filler a larger filling angle, with a device of the same dimensions for filling containers with a filling product, or else the device can be smaller with the same performance. This leads to a reduction in production costs and increased efficiency by comparison with devices known in the state of the art.

Furthermore, by this means the complexity of the device is reduced, since the initiation of the ending of the filling process can take place via the determining unit, taking into account the overrun quantity of filling product. It is thus possible to dispense with additional apparatus which would otherwise be necessary for measuring the fill level or filling product volume, such as a volumetric flow measurement device, a pre-dosing device, or a weighing device on the container receptacle of the transporting device. In addition, due to the lack of a fill level tube for measuring the fill level, it is easier to incorporate in the design the provision of a CIP cap for the cleaning and sterilization of the filling element.

Additionally, due to the synchronous displacement of the at least one determining unit in the sub-section of the transporting path, it is possible, after the initiation by the determining unit of the ending of the filling process, to measure the overrun of filling product, and to check whether the final fill level of the filling product in the filled container corresponds to a predetermined value of the final fill level, or is within a specified tolerance range for the deviation from the predetermined value.

Because the at least one determining unit is displaced synchronously with the transporting device, and hence also displaced synchronously with the container, the container can be kept constantly in the center of the measuring region of the determining unit over the entire sub-section. If the determining unit is generally designed as an optical determining unit, it can thus have a smaller angle of view and/or be displaced at a much smaller distance from the container than was known from the state of the art. By this means the container, and in particular the fill level of the fill product in the container, can be measured very accurately and with a high resolution, thereby further improving the filling outcome.

The at least one determining unit is typically displaced at a constant distance from the transporting device. By this means, the distance between a container displaced by the transporting device and the determining unit that measures the fill level of filling product in the container can be held constant over the entire length of the sub-section in which the fill level is to be measured. Accordingly, no compensation needs to be provided for changes in distance during the measurement of the fill level by the determining unit.

In one embodiment, the at least one determining unit in the sub-section of the transporting path is assigned to one container, and measures the fill level of filling product in only the container to which it is assigned. By this means the determining unit can be displaced synchronously with the container to which it is assigned at a particularly short distance from the container. The measurement of the fill level can accordingly take place in a particularly accurate, precise and high-resolution manner.

Alternatively, a determining unit can be provided for measuring the fill level of more than one container. By this means, the expense of constructing the device can be reduced, while at the same time the fill level can be measured with an increased accuracy by comparison with known devices for filling containers with a filling product.

It can further be advantageous to provide a plurality of determining units, which are displaceable in the sub-section of the transporting path of the container synchronously with the transporting device. By this means the fill level of a plurality of containers transported by the transporting device can be simultaneously measured, and the efficiency of the device, together with that of a filling plant including the device, can be increased.

In a further embodiment, the at least one determining unit is an optical determining unit for optical determination of the fill level. By this means the fill level can be precisely measured, or determined, without the necessity of contact between the determining unit and the filling product and/or the container. Furthermore, if the determining unit is provided in the form of an optical determining unit, the device has a particularly simple design, since it dispenses with a complicated mechanism with moving parts, for example for inserting a probe into the container or implementing a weighing cell.

In order to measure the fill level of the filling product in the container in a particularly precise and simple manner, in some embodiments at least one optical determining unit is a camera, wherein the pictures captured by the camera can be evaluated by means of a suitable evaluation device.

By this means the criteria for ending the filling process can be evaluated. The criteria can be, for example, whether a predetermined fill height has been reached, or whether a predetermined speed at which the filling product level is rising has been reached, or a combination of these criteria.

In certain embodiments, a guiding device is provided for displacing at least one determining unit outside the container to be filled. By means of the provision of the guiding device, the displacement of the determining unit can be decoupled from the displacement of the transporting device. The guiding device is generally disposed in the sub-section of the transporting path. The displacement of the determining unit can thereby be substantially restricted to the sub-section. By this means, in particular when a plurality of containers are filled, and the filling of the containers overlaps chronologically, it is possible to reduce the number of determining units that are necessary for the simultaneous measurement of the fill levels of the containers that are being filled.

In order to be able to provide a particularly compact device for filling containers with a filling product, the determining unit can be disposed on the transporting device.

In some embodiments, the guiding device is disposed at a distance from the transporting device. By this means the displacement of the at least one determining unit can be fully decoupled from the displacement of the transporting device. The at least one determining unit can thereby be displaced only in a region in which it is needed for the measurement of the fill level. In particular in the case of large transporting devices, in which a large number of containers are transported and filled, the measurement of the fill level in the sub-section of the transporting path can be carried out by a small number of determining units.

In this case the guiding device is provided substantially in only the sub-section of the transporting path. A determining unit that is displaced to the end of the sub-section, as viewed in the direction of transport of the transporting device, to measure the fill level of a first container, can be displaced by the guiding device back to the start of the sub-section, as viewed in the direction of transport of the transporting device, and there carry out the determination of the fill level of a further container. Accordingly, only a small number of determining units are necessary for the determination of the fill levels of a multiplicity of containers. The device for filling containers can thus be produced with a low manufacturing cost and a low level of complexity.

In several embodiments, the guiding device is disposed at least along a sub-sector of the filling segment in which the container to be filled is filled with the filling product. The sub-sector typically includes at least one end sector of the filling segment. By this means the fill level of the filling product in the container that is being filled can be measured until the predetermined fill level is reached. If the sub-sector includes the end sector of the filling segment, the end phase of filling can be monitored, and the ending of the filling process can be triggered by the measurement of the fill level by means of the determining unit. In addition, the final fill level in the container, which results from the subsequent flow of the overrun of filling product, can be checked by the determining unit, which measures the fill level in the now filled container. Incorrectly filled containers can thereby be identified and if necessary topped up or discharged.

In addition, at least one determining unit can be in communication with a control unit for controlling and/or regulating the process of filling the container, wherein the ending of the filling process can be determined by means of the determining unit by the measurement of a predetermined fill level and/or the progress of the fill level in the container.

The determining unit signals to the control unit that the predetermined fill level has been reached in the container. The control unit then sends a control command for the ending of the filling process, so that a filling device that is provided for filling the container is closed. The predetermined fill level is chosen to take into account an overrun in the flow of the filling product into the container from the filling device after the closure of the filling device, so that a predetermined final fill level of the filling product is established in the container. The determining unit can additionally measure the final fill level, and transmit this to the control unit. Based on this, in the event of a deviation of the final fill level from the predetermined desired value of the final fill level, or from a predetermined tolerance range within whose limits the final fill level is permitted to deviate from the desired value, the control unit can issue a further control command to a suitable device to top up or discharge the incorrectly filled container.

In some embodiments, the at least one determining unit is guided on a prescribed motion path, for example on a closed motion path. Due to the fact that the at least one determining unit is guided on a prescribed motion path, it is ensured that the determining unit is always in a correct position for measuring the fill level, so that incorrect measurements can be avoided. By means of the provision of a closed motion path, the at least one determining unit can be displaced along the motion path without reversing its direction, and hence with an unvarying direction of movement.

The motion of the at least one determining unit along the motion path is generally translational and/or rotational and/or in a prism-shaped and/or kidney-shaped motion path. By this means, the motion path can be precisely adjusted to the container that is to be measured. In particular, by this means the distance between the determining unit and the container that is to be measured can be precisely adjusted.

In certain embodiments, the motion path is prescribed by the guiding device. By this means it is ensured that the motion of the at least one determining unit can be adjusted and aligned independently of the transporting device or other components of the device for filling containers. Precise alignment of the determining unit with respect to the transporting path of the transported containers is thereby enabled.

In an advantageous embodiment, the motion path has at least one working region, in which the at least one determining unit can be displaced synchronously with the container in order to measure the fill level in the container, and has a return region in which the determining unit can be displaced to the start of the working region. In particular, if more than one determining unit is provided, they can be displaced along the motion path in an unchanging direction of movement. Thus while at least one determining unit is being displaced in the working region, at least one further optical determining unit can be guided from the end of the working region via the return region to the start of the working region. By this means it is also possible, if a plurality of containers are filled, to measure their fill levels simultaneously with a small number of determining units. In this case, the fill level of each container is typically monitored during its filling process by a single determining unit in each case.

In several embodiments, in the return region at least one determining unit can be guided at a different speed, and/or undergoes a different acceleration, from its speed and/or acceleration in the working region. By this means the number of determining units on the guiding device can be reduced. Due to the higher speed of the at least one determining unit in the return region, it can be displaced to the start of the working region in less time than a determining unit needs to traverse the working region.

In one embodiment, the guiding device has a linear guide and/or a carrier belt and/or a magnetic levitation guide and/or a long stator. By this means it is possible to provide precise guidance of the at least one determining unit. By means of the linear guide, the determining unit undergoes a defined displacement. The position of the determining unit can thereby be oriented precisely to the container that is to be measured at every point in its displacement, generally in its motion path, enabling a particularly accurate measurement by the determining unit of the fill level of the filling product. The determining unit can furthermore be displaced smoothly and substantially without free play with a high running accuracy, which enables a high degree of precision in the measurement of the fill level over a long period. As a result, the maintenance costs of the device are low. By means of the provision of a belt, the determining unit can be displaced at low production and energy costs. In this case it is possible by means of a belt to drive a carrier carrying the at least one determining unit.

Alternatively, the determining unit can be disposed directly on the belt, so that the belt has both a driving and a guiding function. The displacement of the determining unit can also be provided by means of a tooth system, wherein a pinion, disposed on a guided carrier including at least one determining unit, meshes with a toothing on the guide. In this case, the pinion can generally be controlled by means of a drive disposed on the carrier.

In alternative embodiments, the determining unit is driven by means of a magnetic levitation guide, and in particular a linear stator drive. A levitation system carrier of the levitation guide which includes the determining unit is typically passively driven, wherein the guide rail is designed as a long stator. By this means, differing speeds of the determining unit can be obtained in a precise and energy-efficient manner.

In certain embodiments, at least one filling valve, displaced with the transporting device, for filling a container is provided, wherein the filling valve can be closed as a consequence of a control command, wherein the control command can be initiated by the measurement, by means of the at least one determining unit, of the predetermined fill level in the container. By this means a particularly precise filling of the container with the filling product can be achieved. The fill volume of the filling product can be particularly accurately adjusted via the filling valve. In addition, this provides reliable reproducibility of the fill volume that is dispensed.

A method for filling containers with a filling product, for example for filling bottles in a beverage filling plant, is described, including the steps of transporting with a transporting device a container to be filled, and filling the container displaced by the transporting device during its transport. At least one determining unit is displaced in a sub-section of the transporting path synchronously with the container that is displaced by means of the transporting device, wherein the determining unit that is displaced synchronously with the container measures the fill level of the filling product in the container. By this means the above-mentioned advantages are achieved.

In certain embodiments, the filling process of the container is ended when the determining unit measures a predetermined fill level in the container.

It can further be advantageous if at least one determining unit is displaced over a sub-sector of the filling segment in which the container to be filled is filled with the filling product, for example at least over an end sector of the filling segment.

It can be particularly advantageous if, in a further development, the determining unit is an optical determining unit, for example a camera, wherein the fill level is optically measured by the optical determining unit.

In a further embodiment, at least one determining unit is displaced by a guiding device.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs, and in order to avoid redundancy repeated description of these elements is in part dispensed with.

Figure 1:
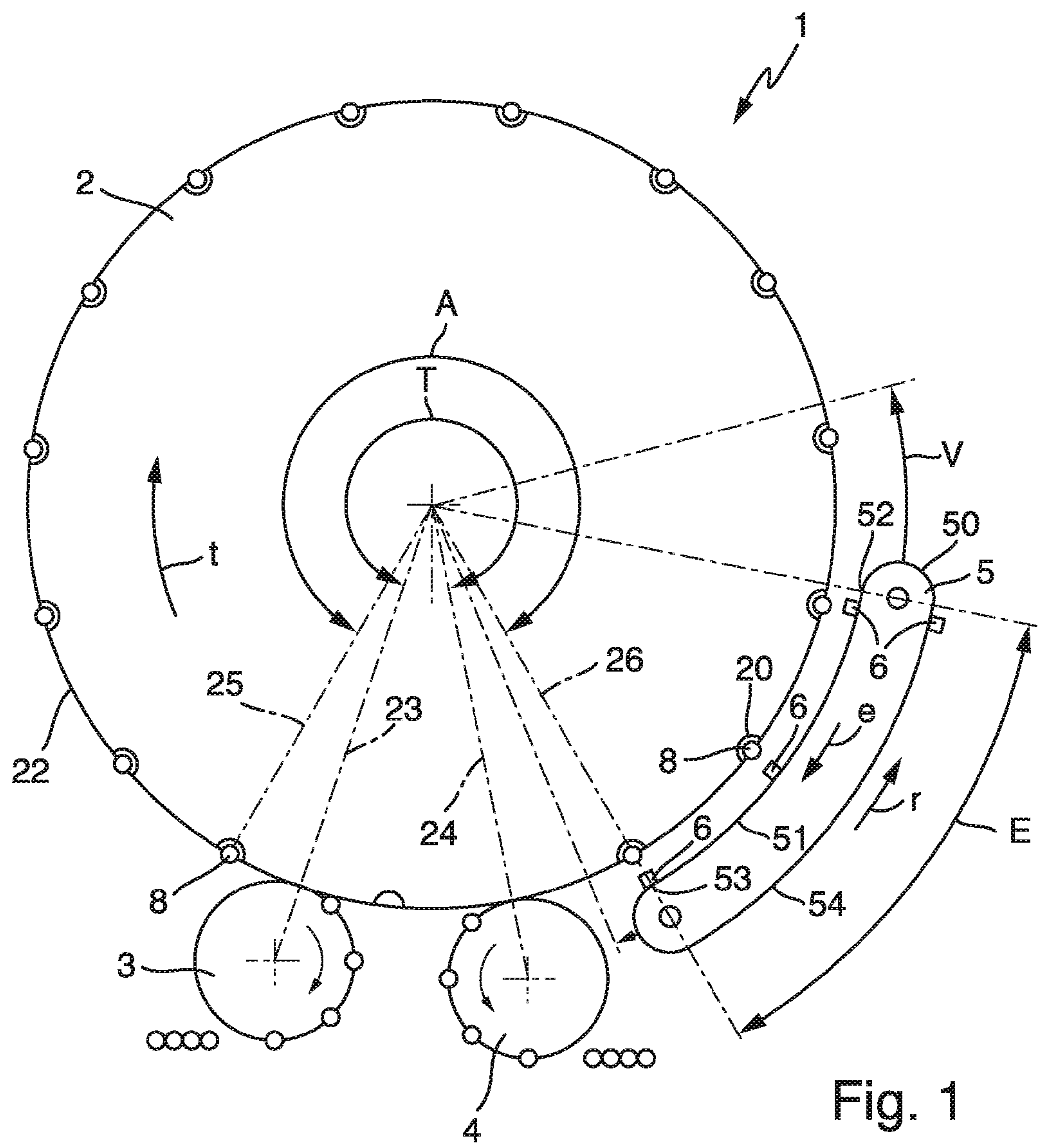
FIG. 1 is a schematic representation a device according to the invention for filling containers with a filling product in a beverage filling plant.

FIG. 1 shows schematically a device 1 according to the invention for filling containers that are to be filled with a filling product in a beverage filling plant. Containers 8 to be filled are conveyed via an infeed starwheel 3 to a filler 2 designed as a rotary filler, and transferred to the filler 2 at the start 23 of a transporting path T. The containers 8 are then transported along the transporting path T through the filler 2 in the transport direction t. At the end 24 of the transporting path T they are transferred to a discharge starwheel 4 and conducted away for further processing.

In the case of a rotary filler, the start 23 of the transporting path T corresponds to the beginning of the treatment angle of the rotary filler, the transporting path T corresponds to the treatment angle, and the end 24 of the transporting path T corresponds to the end of the treatment angle of the rotary filler.

The containers 8 are filled with a filling product in a filling segment A, defined by the start of filling 25 and the end of filling 26, within the transporting path T. For filling the containers 8, a plurality of filling valves 20 are disposed on the transporting device 22, spaced evenly around the periphery of the transporting device 22.

In order to measure the fill level of the containers 8, optical determining units 6 are provided in an end region of the filling segment A, wherein in each case one optical determining unit 6 can be displaced synchronously with in each case one container to be filled, in a measuring region E which corresponds to a portion of the transporting path T. Each optical determining unit 6 has a camera, which is oriented towards the container 8 to be filled whose fill level is to be measured, wherein the fill level of filling product in the container 8 is measured during the displacement of the container 8 that is to be filled along the transporting path T. The determination of the fill level by means of the optical determining units 6 serves to determine the end of the filling process for the applicable container. In this manner, it is possible to derive from the fill level, or the progress in the fill level, the time of closing the applicable filling valve 20 which will lead to the achievement of the desired final fill level in the container.

The derivation of the time of closing the filling valve 20 can for example be achieved by determining that a certain fill height has been reached, and the closing of the filling valve 20 is initiated when this particular fill height is reached. In order to achieve the desired final fill level, the volume filled due to the overrun in the filling valve 20 is taken into account.

In a further embodiment, the time of closing the filling valve 20 can be derived from the determination of the change in the fill level, i.e. the speed at which the level of filling product in the container rises during filling. In this case too, the volume filled due to the overrun in the filling valve 20 is taken into account.

The optical determining units 6 are attached to a guiding device 5, which is disposed at a distance from the transporting device 22. The optical determining units 6 are displaceable along a motion path 50. In order to provide a constant distance between the containers 8 that are transported in the measuring region E and the optical determining units 6, which are in each case displaced synchronously to these, the guiding device 5 is substantially kidney-shaped. The motion path 50 of the guiding device 5 is divided into a circular-arc-shaped working region 51 with a start 52 and an end 53, and a return region 54 which begins at the end 53 of the working region 51 and continues to the start 52 of the working region 51.

In the working region 51, the optical determining units 6 can be displaced synchronously to the containers 8, wherein in each case one optical determining unit 6 is displaced at the measurement speed e synchronously to one container 8 in each case, in order to measure the fill level of the filling product in this container 8. In the return region 54, the optical determining units 6 are displaced at the return speed r, which is higher than the measurement speed e, generally several times higher. By this means, optical determining units 6 which have passed the end 53 of the working region 51 can be conveyed back to the start 52 of the working region 51 in a shorter time than that required by an optical determining unit 6 to traverse the working region 51, so that the optical determining unit 6 is ready at the start 52 of the working region 51 to measure the fill level of a further container 8 that is transported in the measuring region E. By this means the number of optical determining units 6 can be reduced by comparison with a guiding device 5 on which the optical determining units 6 are displaced at a constant speed which corresponds to the measurement speed e, since in the latter case the optical determining units 6 would have to be spaced at uniform intervals.

In this embodiment, the motion path 50 is provided by a magnetic levitation guide. In each case one optical determining unit 6 is allocated to in each case one carrier of the magnetic levitation guide. The guide rail of the magnetic levitation system is designed as a long stator, so that the carriers of the magnetic levitation guide that include the optical determining units 6 are driven via the long stator. Alternatively, however, other types of guide can be used to provide the motion path, for example in the form of a belt-driven or tooth-driven linear guide, or in the form of a guided belt, to which the optical determining units 6 are directly attached.

In addition, the optical determining units 6 are in communication with a control unit (not shown here) for controlling and/or regulating the filling process of the containers 8, wherein the ending of the filling process of a container 8 can be initiated by the measurement of a predetermined fill level in the container 8 by means of the optical determining unit 6 that is assigned to the container 8. In this case, the optical determining unit 6 signals to the control unit that the predetermined fill level has been reached in the applicable container 8. The control unit then sends a control command for the ending of the filling process to the filling valve 20, so that the latter is closed. The predetermined fill height is chosen to take into account an overrun in the flow of the filling product into the container 8 after the closure of the filling valve 20, so that a predetermined final fill level of the filling product is established in the container 8.

The measuring region E, which substantially corresponds to the working region 51, ends, as viewed in the direction of transport t, past the end of filling 26. By this means the optical determining unit 6 can additionally measure the final fill level of the container 8 after the filling valve 20 has closed, and transmit this to the control unit. Based on this, in the event of a deviation of the final fill level from the predetermined desired value of the final fill level, or from a predetermined tolerance range, the control unit can issue a further control command to top up or discharge the incorrectly filled container 8 to a device (not shown here) for topping up or discharging.

The guiding device 5 is displaceable within a displacement region V, in order to adjust the position of the measuring region E with respect to the working region 51 according to the type and size of the containers 8 that are to be filled. By this means it is possible in the device 1 to fill differing types of container, for which differing filling segments A are provided. The position of the measuring region E with respect to the working region 51 is generally adjusted by means of the relocation of the guiding device 5 during the conversion of the device 1 to the applicable new type of container, so that the guiding device 5 is in a fixed position during the filling operation.

Figure 2:
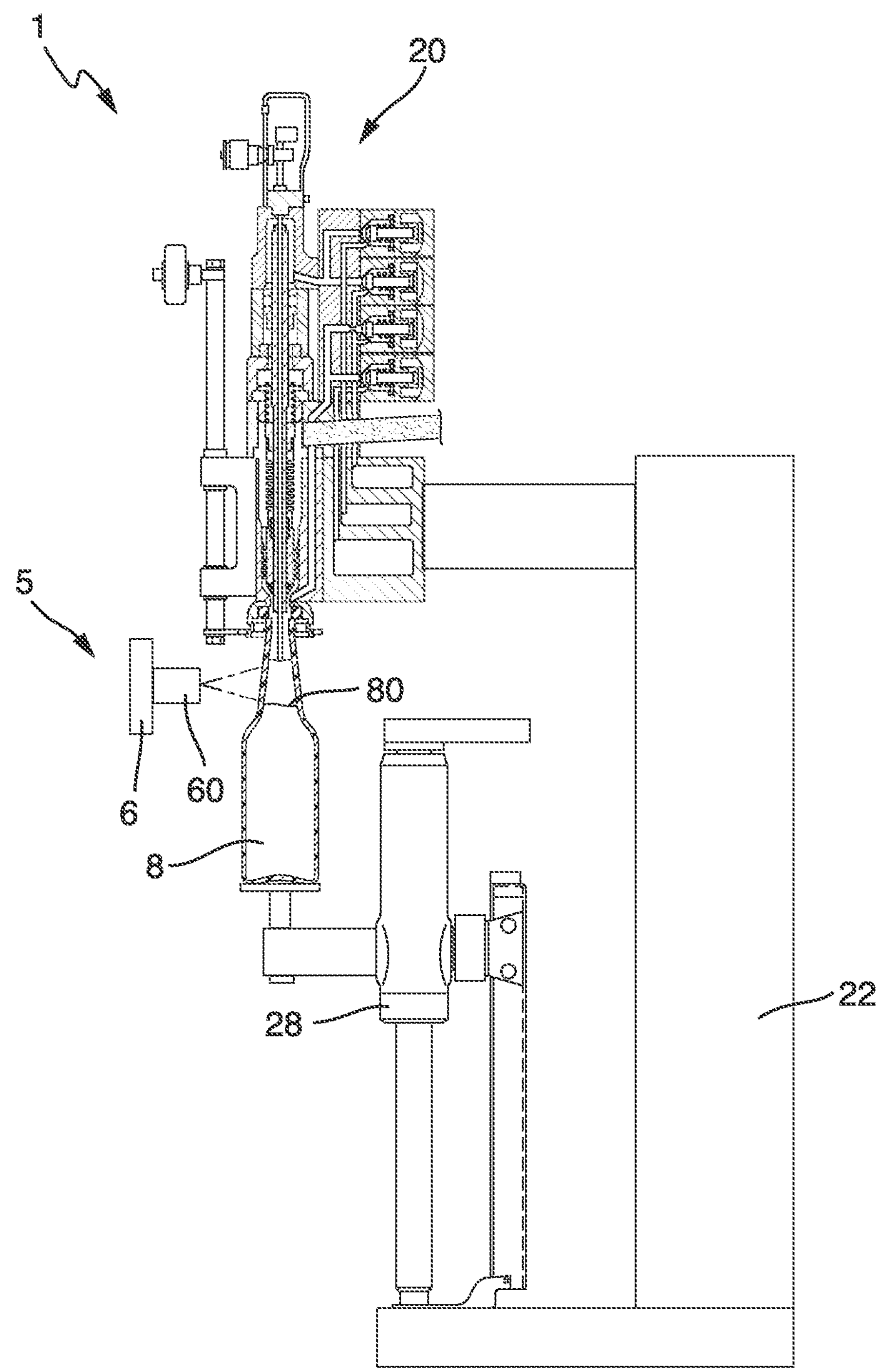
FIG. 2 is a schematic sectional view of a detail of the transporting device of the device from FIG. 1 with a container, during filling by the filling valve, and an optical determining unit which is displaced synchronously with the container.

FIG. 2 shows a schematic sectional view of a detail of the transporting device 22 with a container 8, during filling by the filling valve 20, and an optical determining unit 6 which is displaced synchronously with the container 8. A lifting device 28 disposed on the transporting device 22 presses the container 8 against the filling valve 20. Because the optical determining unit 6 is displaced by the guiding device 5 synchronously with the container 8, it can be disposed very closely to the container 8. The camera 60 of the optical determining unit is oriented in the direction of the container 8, and measures the fill level 80 that is present in the container 8.

To the extent applicable, all individual features described in the example embodiments can be combined with each other and/or exchanged, without departing from the field of the invention.

The invention claimed is:

1. A device for filling a container with a filling product in a beverage filling plant, comprising:
- a transporting device configured to transport the container along a transporting path during a filling process; and
- at least one determining unit configured to determine a fill level of the filling product in the container and to be displaced synchronously with the transporting device in a sub-section of the transporting path of the container, wherein:

the at least one determining unit is guided on a prescribed motion path, and the prescribed motion path comprises:
- at least one working region in which the at least one determining unit is displaceable synchronously with the container in order to measure the fill level in the container, and
- a return region in which the at least one determining unit is displaceable to a start of the at least one working region, and is configured to be guided at a different speed and/or to undergo a different acceleration, from a speed and/or an acceleration in the at least one working region.

2. The device of claim 1, wherein the at least one determining unit comprises an optical determining unit configured to optically measure the fill level of the filling product in the container.

3. The device of claim 2, wherein the optical determining unit comprises a camera.

4. The device of claim 2, wherein the optical determining unit is in communication with a control unit configured to control and/or regulate a process of filling the container.

5. The device of claim 1, further comprising a guiding device configured to guide the at least one determining unit outside the container.

6. The device of claim 5, wherein the guiding device is disposed on the transporting device.

7. The device of claim 5, wherein the guiding device is disposed at a non-zero distance from the transporting device.

8. The device of claim 5, wherein the guiding device is disposed at least along a sub-sector of a filling segment in which the container is filled with the filling product, and the sub-sector comprises at least one end sector of the filling segment.

9. The device of claim 5, wherein the guiding device comprises a linear guide, a carrier belt, a magnetic levitation guide, and/or a long stator.

10. The device of claim 1, further comprising at least one filling valve configured to fill the container and to be closed as a consequence of a control command, wherein the control command is initiated by a measurement of the fill level of the container by the at least one determining unit.

11. The device of claim 1, wherein the at least one determining unit is configured to be guided at a higher speed in the return region than in the at least one working region.

12. A method for filling a container with a filling product, comprising:
- transporting the container with a transporting device;
- guiding at least one determining unit on a prescribed motion path, wherein the prescribed motion path comprises:
  - at least one working region in which the at least one determining unit is displaceable synchronously with the container in order to measure a fill level in the container, and
  - a return region in which the at least one determining unit is displaceable to a start of the at least one working region, and is guided at a different speed and/or undergoes a different acceleration, from a speed and/or acceleration in the at least one working region;
- filling the container with the filling product during transport of the container; and
- measuring a fill level of the filling product in the container with the at least one determining unit.

13. The method of claim 12, further comprising determining, from the fill level, that an end of a filling condition exists.

14. The method of claim 13, further comprising ending a filling process of the container after determining that the end of the filling condition exists.

15. The method of claim 13, wherein the end of the filling condition comprises a predetermined fill level of the filling product in the container.

16. The method of claim 12, wherein the at least one determining unit is displaced over at least a sub-section of a filling segment in which the container is filled with the filling product.

17. The method of claim 16, wherein the sub-section of the filling segment comprises an end sector of the filling segment.

18. The method of claim 12, wherein the at least one determining unit is guided at a higher speed in the return region than in the at least one working region.

* * * * *